INVENTOR
DONALD J. COX

Jan. 28, 1969
D. J. COX
3,423,797
BOLL AND BURR EXTRACTORS
Filed Nov. 5, 1965
Sheet 2 of 5
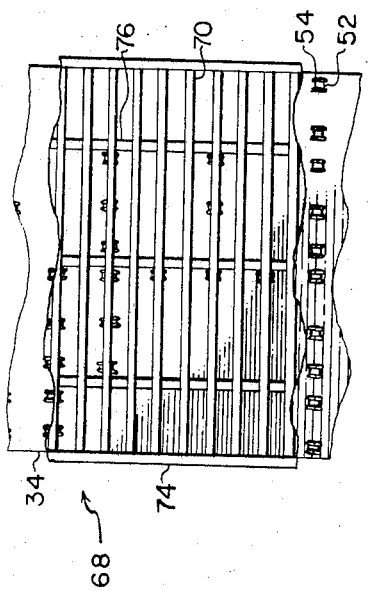
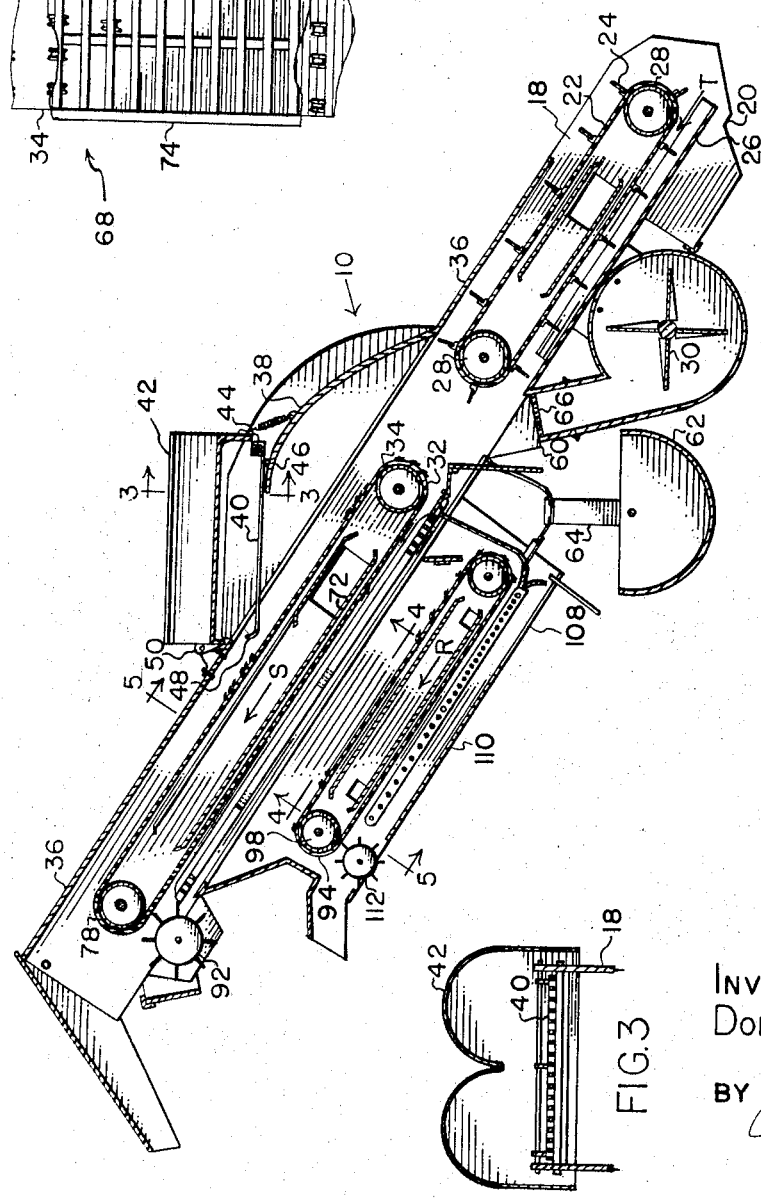
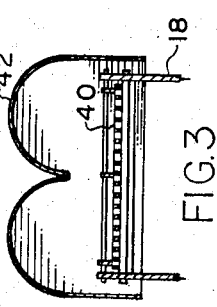
INVENTOR
DONALD J. COX
BY

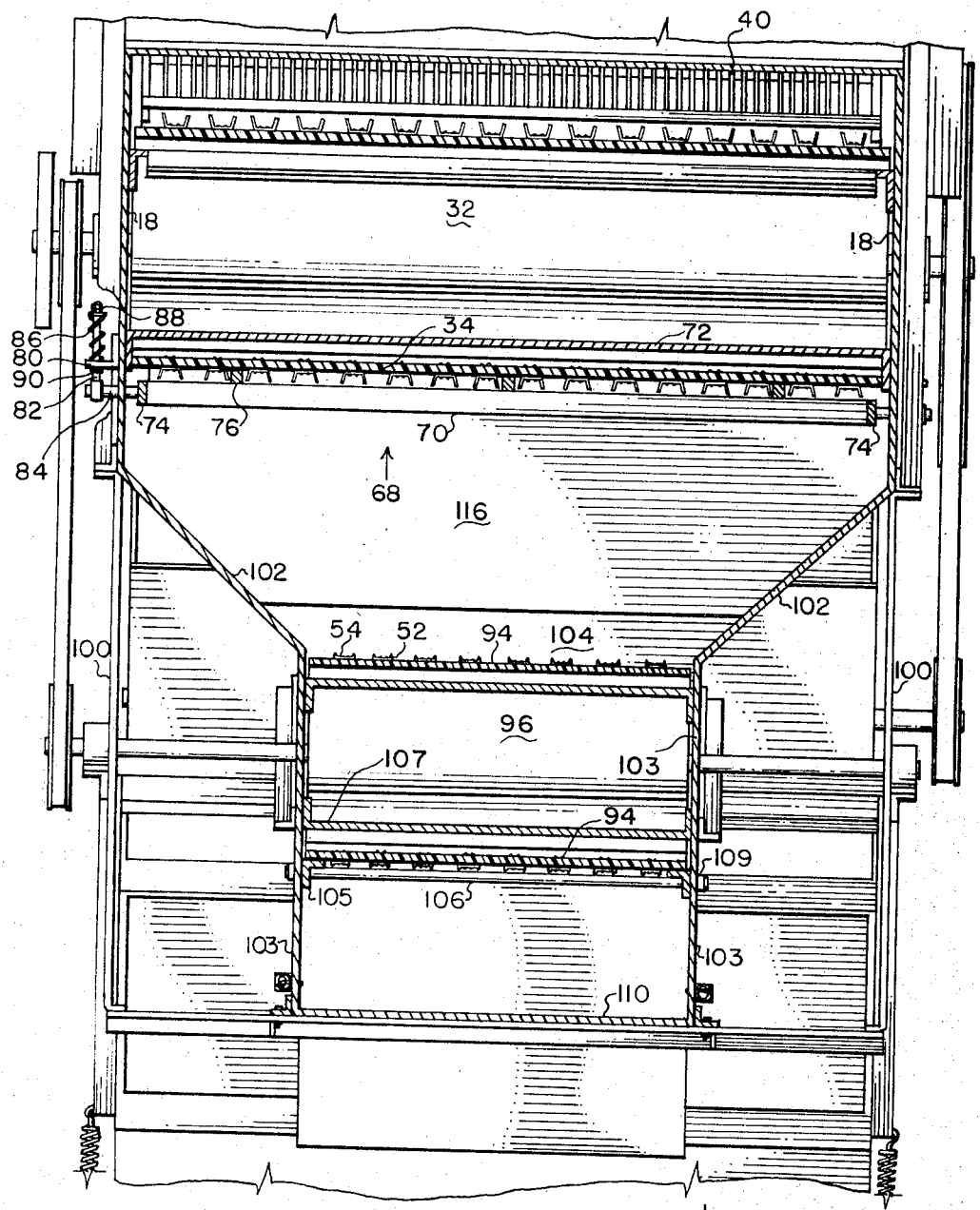

Jan. 28, 1969  D. J. COX  3,423,797
BOLL AND BURR EXTRACTORS
Filed Nov. 5, 1965  Sheet 5 of 5

INVENTOR
DONALD J. COX 3,423,797
BOLL AND BURR EXTRACTORS
Donald J. Cox, Enochs, Tex., assignor to Cotton Enterprises, Inc., Paris, Tex., a corporation of Texas
Filed Nov. 5, 1965, Ser. No. 506,563
U.S. Cl. 19—202
Int. Cl. D01b 3/00, 1/00; B07b 7/00
3 Claims

ABSTRACT OF THE DISCLOSURE

In cleaning cotton, green bolls are separated from the cotton by blowing the seed cotton upward, allowing the heavier green bolls to fall downward. While the seed cotton is entrained in a blast of air, it is blown onto a saw belt. Burrs are removed from the saw belt by resiliently pressing transverse bars against the seed cotton on the saw belt.

---

This invention is related to my prior patent applications as follows:

Ser. No. 747,132, filed July 8, 1958, Patent No. 3,035,312 issued on May 22, 1962; Ser. No. 194,882, filed May 15, 1962, before the Board of Appeals; Ser. No. 405,659, filed Oct. 22, 1964, pending in Group 440.

This invention relates to cotton harvesting and more particularly to a machine for separating stripped cotton into burrs, seed cotton, green bolls, and trash.

Large volumes of flow of cotton must be handled by such a machine. If the machine is to be attached to the cotton stripping mechanism and therefore be portable it must be compact and lightweight. To meet these requirements, I have found it extremely advantageous to use a belt with saw teeth attached thereto. I have found with this arrangement I can obtain a much larger capacity with a small compact machine.

A fan is used to load the cotton upon the saw carrying belt. In this same process, the green bolls are separated out. The burrs are separated by dragging the cotton over a series of bars. Rails above the bars guide the belt and space the belt the proper distance from the bars. A backup plate presses the belt to the rails. The bars are resiliently mounted to prevent choke-ups should a foreign object (such as a beer can or a large wad of cotton) be fed in.

To prevent any loss of cotton, a second belt with saw teeth attached thereto is used below the first one as a reclaimer.

An object of this invention is to separate burrs from seed cotton on a harvesting machine.

Another object is to provide a machine for separating burrs, green bolls, and trash from the seed cotton.

Another object is to provide a machine for accomplishing the above without loss or waste of any cotton.

Another object is to achieve the above with a machine particularly adapted to be portable.

A further object is to provide such a machine which does not need to be adjusted as between operating conditions of high capacity and low capacity.

Still further objects are to achieve the above with a device that is sturdy, compact, durable, safe, simple and reliable, yet inexpensive and easy to manufacture and operate.

Still further objecst are to achieve the above with a method that is rapid, inexpensive, and does not require skilled people to adjust and operate.

The specific nature of the invention, as well as other objects, uses, and advantages thereof, will clearly appear from the following description and from the accompanying drawing, the different view of which are not necessarily to the same scale, in which:

FIG. 2 is a sectional view of the entire machine.

FIG. 3 is a partial sectional view taken substantially upon line 3—3 of FIG. 2.

FIG. 4 is a partial sectional view taken substantially upon line 4—4 of FIG. 2.

FIG. 5 is a partial sectional view taken subtsantially upon line 5—5 of FIG. 2 partially broken away to show details of construction.

Figure 1:
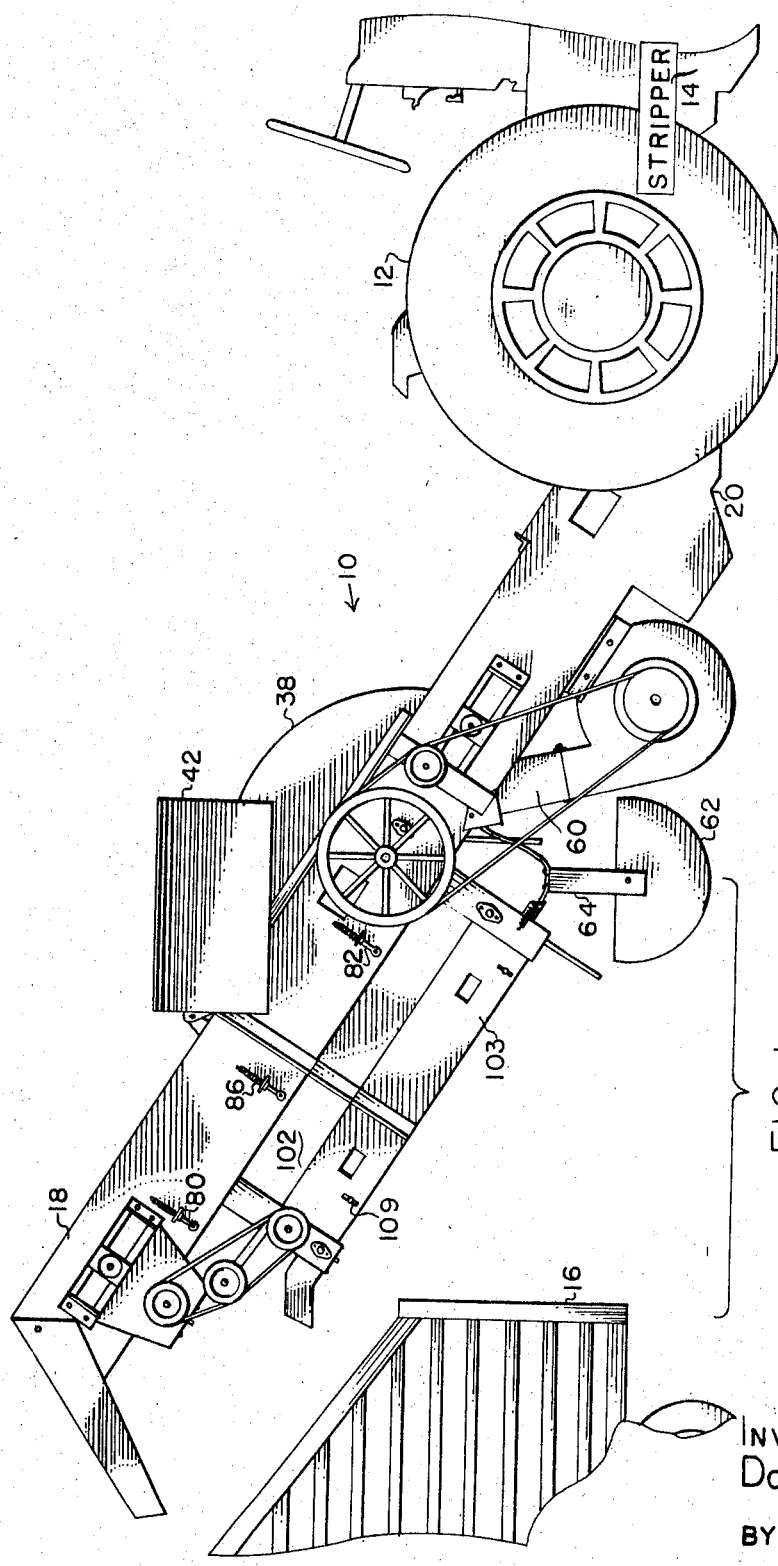
FIG. 1 is a side elevational view of a machine according to this invention with associated equipment.

Referring more particularly to FIG. 1, cleaner 10 is adapted to be mounted upon vehicle 12 (illustrated as a standard farm tractor). Stripper 14 is also mounted upon vehicle 12. Inasmuch as strippers are well known, the stripper will not be described further except to note that it is of the general type in wide commercial use which removes open bolls, cotton, and green bolls, along with a certain amount of limbs, dead leaves, and other trash.

The cotton is conveyed from the stripper 14 to the cleaner 10 by a conventional mechanism. It is discharged from the cleaner 10 into container 16, which is illustrated as a trailer towed behind the vehicle 12, although it will be understood that the container 16 could be a basket carried upon the vehicle 12.

Two side plates 18 extend along the entire length of the cleaner 10. Mounting means 20 interconnect the side plates 18 and the vehicle 12 for mounting the cleaner to the vehicle. The side plates 18 form the main frame for the cleaner 10.

Transfer belt 22 is located adjacent the inlet end of the cleaner (FIG. 2). The transfer belt has a plurality of transverse flights 24 which act to drag the cotton along perforated bottom 26 where some cleaning occurs. The transfer belt 22 is trained over a pair of parallel pulleys 28 which are journaled within bearings attached to side plates 18. As may be seen, the belt travels in a direction to move the cotton along in the direction of Arrow T.

Figure 6:
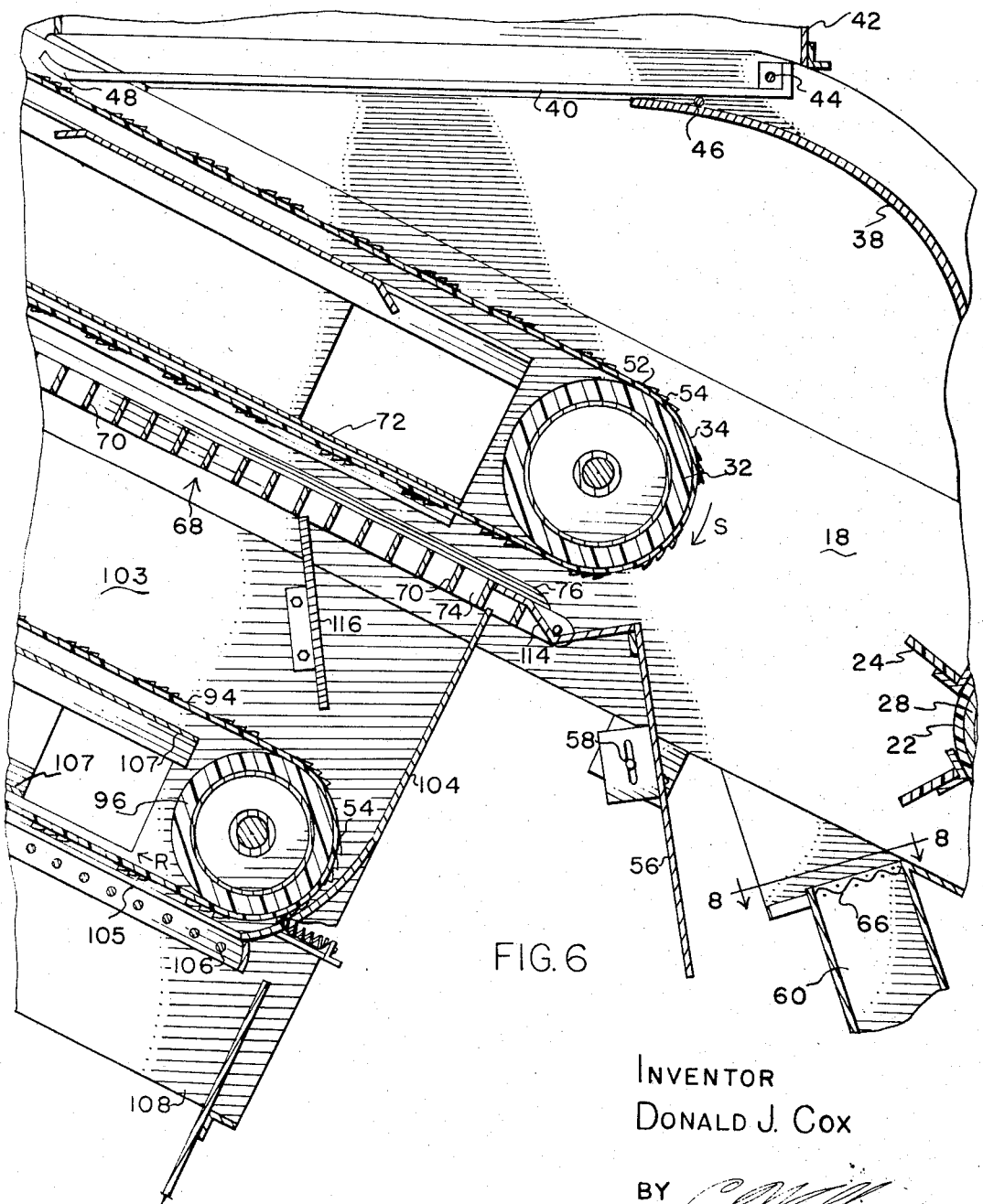
FIG. 6 is a partial sectional detail view showing a portion of the machine as shown in FIG. 2 on a larger scale to better illustrate details of construction.
Figure 8:
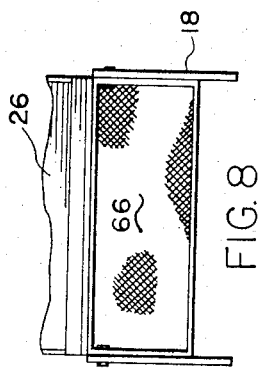
FIGURE 8 is a partial sectional view taken substantially along the line 8—8 of FIGURE 6.

Air blast fan 30 is attached to the cleaner 10 by suitable brackets depending from the side plates 18. It directs a blast of air between the discharge of the transfer belt 22 and proximate pulley 32 for the main saw belt 34. The main saw belt is driven so that it travels in a direction as indicated by Arrow S (FIG. 6). The top of the cleaner is covered with a cover 36 except for that portion covered by deflector 38 and screen 40. The deflector 38 curves upward at the end of the transfer belt 22 to deflect the air and cotton from the blast fan 30 along the screen 40. The screen 40 extends from the terminal of the deflector 38 to a point just above the main saw belt 34.

The blast of air from the fan 30 carries the seed cotton, burrs, and trash upward from the point where they are discharged from the transfer belt 22. The air, trash, seed cotton, and burrs are all deflected by deflector 38 along the screen 40. The cotton, burrs, and larger pieces of trash are deflected down the screen onto the main saw belt 34. It is desirable for good operation that the air and cotton be directed so that it "wipes" or moves at an angle to the screen 40. Difficulty is encountered if an attempt is made to blow the air, cotton, etc., directly against the screen 40. Therefore, it is necessary that the air be deflected from its original path by the deflector 38 so that the cotton is directed toward the top of the saw belt more by the deflector than by the screen.

The exhaust air and smaller bits of trash are exhausted through the screen 40. Hood 42 above the screen 40 deflects the exhaust air and trash downward so that it does not blow into the container 16 to irritate workmen and contaminate clean cotton there. The screen 40 is constructed of a series of parallel ⅜" diameter rods, ¾" on center. The screen is pivoted at its upper end at 44 to the terminal of the deflector. The rods are attached as by welding to the pivot rod 44 and to support rod 46, which is located just above the termination of the deflector. The screen rods are unconnected for the remainder of their length to prevent lint or trash from hanging onto any connections which would otherwise be present. The ends 48 of the screen rods are bent upward so that, if they should swing down through vibration or otherwise and contact the saw belt 34, major damage will not result.

The position of the screen 40 may be adjusted inasmuch as the support rod 46 extends through slots in the side of the upward curved portion of the side plates 18 to either side of the screen. Adjustable stops (not shown) provide adjustment so that the position of the ends 48 may be adjusted.

The hood 42 is pivoted at 50 which extends along the cover 36 from one side plate to the other.

It may be seen from this arrangement that I have provided an exceptionally large area upon the saw belt 34 on which to load seed cotton. By the use of this large area, I am able to move the saw belt at a high rate of speed and insure a high capacity for the machine.

The fan 30 provides a plurality of functions. These include a classification of material—the heavy material being classified into green boll catcher 62, the lighter larger material being classified onto the belt, and the lighter smaller material being classified through screen 40. Also, the fan forms the transportation means for transporting the cotton from the transfer belt 22 to the top of the main saw belt 34. Also, the fan forms means for holding the seed cotton to the teeth of the belt as it curves around the proximate pulley.

The saw belt is constructed by stapling a plurality of saw strips 52 to the belt 34. Each saw strip has a plurality of teeth or picks 54 thereon. Conventionally these picks are called saw teeth, although they have no function of cutting but the sole function of snaring or entangling or picking the locks of seed cotton and thus carrying them along with the belt 34. All of the picks 54 upon the belt 34 point in the same direction which is the direction of travel of the belt as shown by Arrow S. As the belt travels over the proximate pulley 32, the picks 54 are traveling downward which is the opposite direction to the air blast. Therefore, the air blast tends to hold the cotton onto the picks 54 whereas otherwise there would be a tendency to slinging it off because of centrifugal forces.

Also, should any of the cotton be carried over the proximate pulley 32 by the belt 34 as a conveyor rather than being snagged upon one of the picks 54, the air blast will carry it back upward and onto the saw belt at the large area beneath the screen 40.

Baffle 56 is pivoted by a pair of bolts 58 extending through slots in ears upon the baffle and corresponding slots within ears welded to side plates 18 (FIG. 6). The baffle may be adjusted to many different positions to obtain the best results, the best results being to throw all the cotton onto the belt 34 and to drop all of the green bolls through an opening between the baffle 56 and the discharge 60 of the air blast fan 30. The green bolls falling through the opening are caught in the green boll catcher 62 which is mounted on legs 64 which depend from side plates 18 (FIGS. 1 and 2). The discharge 60 of the fan 30 which points substantially vertically upward between the discharge of transfer belt 22 and proximate pulley 32 is covered by screen 66 to prevent rocks or other heavy material which might be in the stripped cotton from falling into the fan. The green boll catcher is emptied at the turnrow where the green bolls are permitted to dry up and open, to be gathered for cotton contained in them. Because they are left in piles at the turnrow, a certain amount of burrs and dry trash in them is not undesirable inasmuch as this dry material prevents from rotting or mildewing.

Figure 7:
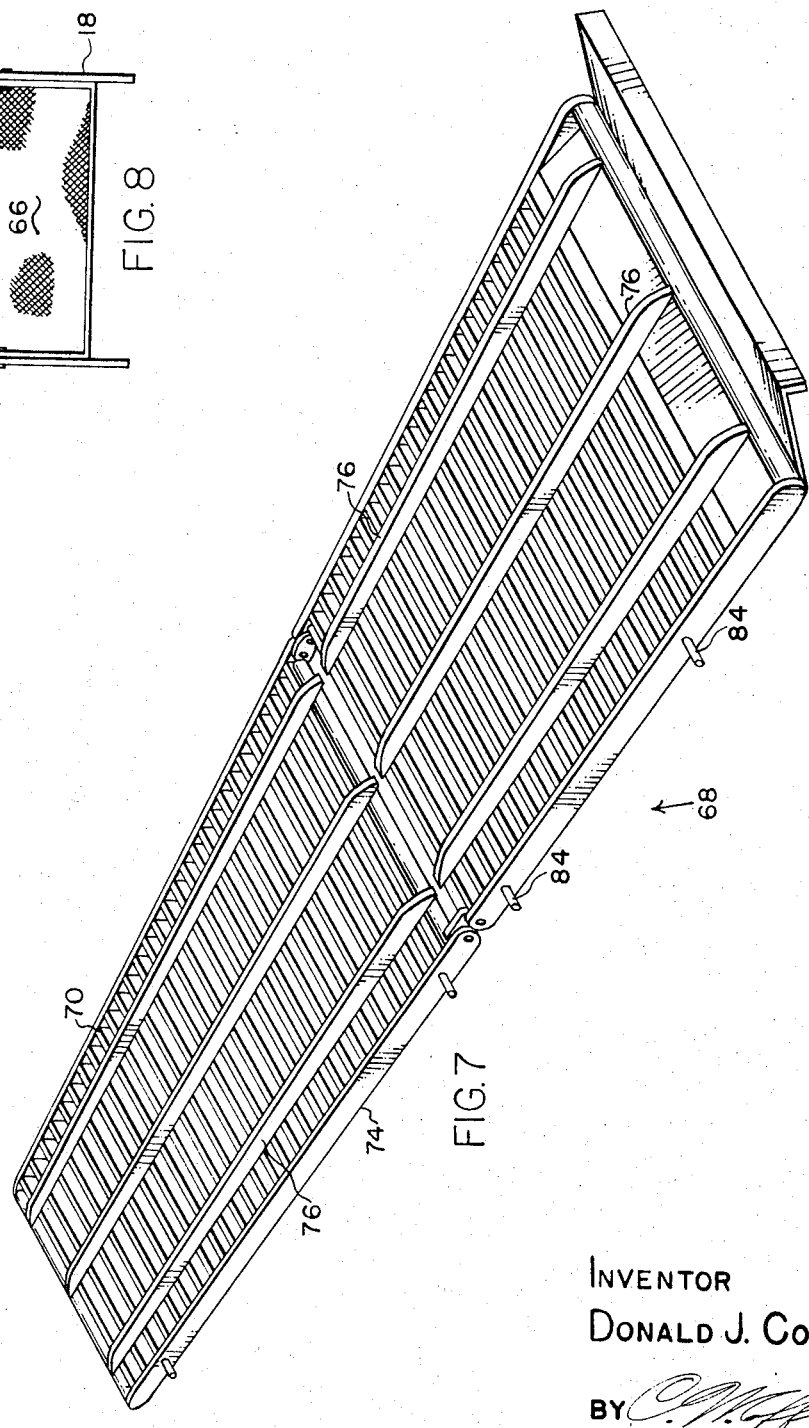
FIG. 7 is a perspective view of the main bar subframe shown removed from the machine.

The removal of the burrs from the seed cotton is accomplished by dragging the seed cotton with burrs over grid or subframe 68 (FIGS. 5 and 7). The grid includes a plurality of transverse bars 70 which are attached together as the subframes. The subframes include side plates 74 to which the bars 70 are welded. The subframes 68 also include guide rails 76 which extend longitudinally between the bars 70 and the belt 34. Specifically, three guide rails 76 are attached to the subframes 68. These guide rails perform the function of supporting the belt 34 the proper distance above the bars 70. It is necessary that this proper spacing be maintained for the proper removal of the burrs from the seed cotton. Inasmuch as the belt is made of flexible material (such as rubber-covered canvas) it is necessary to have a plurality of these guide rails to maintain equal spacing from one side of the belt to the other. Furthermore, the guide rails 76 fit in wide spaces between rows of saw strips 52 on the belt 34 to guide the belt and keep it from moving to the right or to the left. It has been found desirable not to use crowned pulleys for the proximate pulley 32 or discharge end pulley 78 upon which the belt 34 is trained. It has been found that, because of the stretching of the belt over a crowned pulley, it is difficult to keep the saw strips 52 stapled upon the belt.

For proper operation of the cleaning of the cotton, it is necessary that the cotton be pressed against the bars. Therefore, backup plate 72 is attached from one side plate 18 to the other immediately above the portion of the belt 34 which is above the bars 70. Therefore, the picks 54, loaded with seed cotton, are pressed downward against the bars 70.

The subframes 68 are resiliently mounted to the side plates 18 (FIG. 5). Ears 80 are welded to the side plates and eye bolts 82 extend through holes in the ears. The eye on the bottom of the bolts 82 is attached to pins 84 which are attached to the subframes 68 and extend through slotted openings in the side plates 18. Compression helical springs 86 extend between the ears 80 and nuts 88 on the end of the bolts 82. Jam nuts 90 below the ears 80 limit the upward travel of the subframes 68. By upward travel, it will be understood to mean this is the travel toward the belt. Under normal conditions, the spacing between the belt and the bars 70 is maintained by the guide rails 76. However, should a foreign object, such as a beer can, be accidentally carried along with the cotton into the burr extraction area, it is possible for the bars 70 to move downward away from the belt to prevent injury to the machine. Also, should a large wad or slug of cotton be fed to the machine (e.g., in stopping or starting the machine) the bars move away from the belt to prevent a condition being created that would cause the belt 34 to slip upon the pulleys or for the machine to be stalled otherwise. Furthermore, the resilient support means (elements 80–90) act to some extent as a self-regulating device, i.e., if the stripper is operating to throw extremely large amounts of cotton onto the belt, the belt will naturally ride further away from the bars 70 as is desirable. On the other hand, if small amounts of cotton are being harvested and the belt 34 is only lightly loaded with cotton, the belt will operate closer to the bars 70. Therefore, optimum operating conditions result over a wide range of rates of supply.

The guide rails 76 are beveled at each end to provide smooth transition. Two subframes 68 are provided. At the discharge end of the cleaner, main doffer roller 92 doffs the cotton from the picks 54 into the container 16. The doffing roller is more particularly shown and described in my co-pending application, Ser. No. 405,659, noted above. However, doffing rollers in general are well known and conventional doffers may be used, although best results are obtained according to the embodiment disclosed in my prior application.

Some cotton will pass through the bars 70 along with the burrs and other bits of trash. So that this cotton is not wasted, all of the material which passes through the grid or subframe 68 is dropped upon reclaimer belt 94. The reclaimer belt 94 is trained over pulleys 96 and 98. The reclaimer belt has saw strips 52 attached thereto, having teeth or picks 54 on them. In this respect, it is quite similar to the main saw belt 34 except that it is shorter and narrower. The pulleys 96 and 98 are journaled within bearings which are attached to reclaimer brackets 100, which are securely attached below the main side plates 18. The reclaimer belt travels in the direction of Arrow R. Transition plates 102 enclose the area from the subframes 68 to the top of reclaimer belt 94. Reclaimer side plates 103 extend on either side of the reclaimer saw belt and therebelow. The reclaimer side plates 103 are parallel to and below the main side plates 18. Therefore, all material passing through the bars 70 is caught upon the reclaimer belt 94. The picks 54 spear any seed cotton within the material. The burrs and other trash are carried along the belt. Springloaded presser plate 104 pushes all of this material against the reclaimer belt as the reclaimer belt passes over the pulley 96. Reclaimer grid 106 is mounted immediately below the reclaimer belt; therefore, all of the burrs and trash fall on through the reclaimer grid and are discharged through opening 108 in bottom closure 110 of the reclaimer section of the cleaner 10. As may be seen, the burrs and trash are discharged directly upon the soil, which is beneficial.

The side plates 105 of the reclaimer grid are in the form of angle irons. The reclaimer belt 94 rides at its edges upon legs of the side plates 105. Due to the narrow width of the reclaimer belt 94, this is the only support and spacing necessary for the reclaimer belt. The reclaimer belt is guided by its contacts with the side plates 103 at least in part. Reclaimer backup plate 107 is attached between the side plates 103 immediately above the working portion of the reclaimer belt 94 and functions in similar fashion to backup plate 72. The reclaimer grid 106 is adjustably mounted between the side plates 103 by having studs 109 extend through slotted openings in the reclaimer side plates 103 and are held in adjusted position by nuts upon the studs.

The seed cotton caught upon the picks 54 of the reclaimer belt 94 are doffed therefrom by the reclaimer doffer 112 into the container 16. As may be seen, the reclaimer doffer is immediately below pulley 98 and is similar to but smaller than the doffer roller 92.

Guide 114 of one of the main subframes 68 forms a boll cracker, i.e., often there will be dry, unopened bolls of cotton stripped from the plant along with the other material. This material will be classified upward and onto the main belt 34. It will be carried around to the guide 114 probably by one of the picks 54 puncturing the boll. When it is carried over the guide 114, it will be broken open. However, inasmuch as the cotton within the boll is not caught upon one of the picks 54, the cotton itself will pass through the bars 70 and onto the reclaimer section. Therefore, the cotton which is caught on the reclaimer section will generally be of a lesser grade than the cotton doffed into the trailer by the main doffing roller 92. Therefore, there will be a certain amount of classification of the cotton within the container 16, the whiter, better cotton being to the rear and the lesser grade cotton being to the front.

It has been found that a baffle 116 at the inlet or lower end of the translational area between the bar 70 and the reclaimer belt 94 is desirable. Otherwise, burrs and trash tend to gather upon the presser plate 104. It has been found that with the inclusion of the baffle 116 this build-up of burrs does not occur, the small amount which falls onto the presser plate 104 behind the baffle 116 will slide onto the reclaimer belt 94 satisfactorily.

It is believed that one of the advantageous features of my burr extractor is that the burrs are extracted from the cotton in a downward direction, i.e., the pull of gravity helps remove burrs and small, fine leaf trash and sand from the seed cotton as it is being pulled over the bars 70. This is another advantageous feature of using a belt with teeth thereon, it naturally lends itself to have the cotton loaded onto the belt over a large area and have the trash removed from the cotton in a downward direction so that it is aided by gravity and by having a long travel so that it is possible to use a multitude of bars 70.

It is considered impossible to get a sufficient high capacity of seed cotton upon a reasonable size cylinder which is readily carried upon a stripping vehicle. The principal reason is that with a cylinder there is not sufficient area upon which to load the cotton onto the cylinder and therefore sufficient capacity could not be obtained from the cylinder even though the cylinder might have as many individual saw teeth as are present on the belt.

The machine is provided with suitable drive belts and chains. Inasmuch as drive belts and chains are well known to skilled craftsmen in many arts, including the art of cotton ginning and the art of harvest equipment, they have not been described herein and only incidentally shown in the drawings. Likewise, the machine is provided with numerous clean-out holes, openings and windows as is well known in the art of cotton ginning and the art of harvesting machines. Likewise, certain baffles and guides directing the cotton from the doffers into the containers have not been specifically described due to their conventional nature. Many other individual elements and adjustments of the tensioning of the belts, etc., fall in this general category of conventional equipment which is not specifically described.

It will be apparent that the embodiment shown is only exemplary and that various modifications can be made in construction, materials, and arrangements within the scope of the invention as defined in the appended claims.

I claim as my invention:

1. The method of both classifying stripped material from cotton stalks and loading a saw belt with seed cotton comprising:
    (a) delivering stripped material from cotton stalks to an area,
    (b) subjecting the material to an upward directed air blast, so that heavier material falls downward while the seed cotton and other lighter material is carried upward with the air blast,
    (c) deflecting the air blast and material therewith along the underside of a screen,
    (d) sliding the seed cotton from the screen onto a saw belt, the air passing through the screen,
    (e) moving the saw belt toward the air blast so that the cotton on the belt is moving in the opposite direction of the cotton in the air blast, and
    (f) dragging the seed cotton on the saw belt over transverse bars so that trash and burrs are removed therefrom by being beat against the bars and by gravity.

2. The invention as defined in claim 1 with the additional step of
    (f) resiliently pressing the bars against the seed cotton on the saw belt as the seed cotton is being dragged over the bars.

3. The method of both classifying stripped material from cotton stalks and loading a saw belt with seed cotton comprising:
    (a) delivering stripped material from cotton stalks to an area,
    (b) subjecting the material to an upward directed air blast, so that heavier material falls downward while the seed cotton and other lighter material is carried upward with the air blast,
    (c) deflecting the air blast and material therewith along the underside of a screen,
    (d) sliding the seed cotton from the screen onto a saw belt, the air passing through the screen, and (e) centrifugally slinging heavier material on the saw belt therefrom through the air blast.

References Cited
UNITED STATES PATENTS

| | | | |
|---|---|---|---|
| 661,166 | 11/1900 | Boyd | 19—65 |
| 2,502,817 | 4/1950 | Bennett. | |
| 2,831,565 | 4/1958 | Hensley | 198—82 |
| 3,107,475 | 10/1963 | Gustafson | 209—27 |
| 1,276,370 | 8/1918 | Irwin et al. | 19—38 |
| 1,990,816 | 2/1935 | Conrad | 19—36 |
| 2,791,001 | 5/1957 | Roscoe et al. | 209—137 |

MERVIN STEIN, *Primary Examiner.*

IRA C. WADDEY JR., *Assistant Examiner.*

U.S. Cl. X.R.

19—205; 209—137